US008456728B2

(12) United States Patent
Chen et al.

(10) Patent No.: US 8,456,728 B2
(45) Date of Patent: Jun. 4, 2013

(54) ELECTROWETTING DISPLAY AND PIXEL ARRAY SUBSTRATE THEREOF AND ELECTROWETTING DISPLAY PIXEL STRUCTURE THEREOF

(75) Inventors: Cheng-Yi Chen, Changhua County (TW); Chih-Yuan Wang, Taichung County (TW)

(73) Assignee: Wintek Corporation, Taichung (TW)

( * ) Notice: Subject to any disclaimer, the term of this patent is extended or adjusted under 35 U.S.C. 154(b) by 146 days.

(21) Appl. No.: 12/979,328

(22) Filed: Dec. 28, 2010

(65) Prior Publication Data

US 2011/0157678 A1  Jun. 30, 2011

(30) Foreign Application Priority Data

Dec. 31, 2009 (TW) ................................ 98146186 A

(51) Int. Cl.
*G02F 1/03* (2006.01)
*G02F 1/29* (2006.01)
*G02B 26/02* (2006.01)

(52) U.S. Cl.
USPC ........... 359/245; 359/228; 359/259; 359/316; 345/84

(58) Field of Classification Search
USPC ................. 359/245–247, 250, 252–254, 228, 359/296, 248, 249, 251, 255–258, 259, 315, 359/316; 345/32, 41, 60, 84, 105–107, 204, 345/179; 252/500, 586; 204/451, 452; 445/24
See application file for complete search history.

(56) References Cited

U.S. PATENT DOCUMENTS

| 7,746,540 | B2 * | 6/2010 | Lo et al. ........................ 359/290 |
| 7,763,314 | B2 * | 7/2010 | Dai et al. ...................... 427/164 |
| 7,813,030 | B2 * | 10/2010 | Lo et al. ........................ 359/295 |
| 7,872,790 | B2 * | 1/2011 | Steckl et al. .................... 359/253 |
| 7,903,061 | B2 * | 3/2011 | Zhang et al. ..................... 345/84 |
| 8,068,266 | B2 * | 11/2011 | Kim et al. ...................... 359/254 |
| 8,163,150 | B2 * | 4/2012 | Vann et al. ..................... 204/450 |
| 2007/0127108 | A1 | 6/2007 | Hayes et al. |
| 2012/0057217 | A1 * | 3/2012 | Ku et al. ........................ 359/290 |
| 2012/0081777 | A1 * | 4/2012 | Heikenfeld et al. .......... 359/290 |

FOREIGN PATENT DOCUMENTS

| CN | 101023462 | 8/2007 |
| CN | 101378611 | 3/2009 |

OTHER PUBLICATIONS

"First Office Action of China Counterpart Application", issued on Mar. 31, 2012, p. 1-p. 4.

* cited by examiner

*Primary Examiner* — Loha Ben
(74) *Attorney, Agent, or Firm* — Jianq Chyun IP Office

(57) ABSTRACT

An electrowetting display, a pixel array substrate thereof, and an electrowetting display pixel structure thereof are provided. The electrowetting display pixel structure is disposed on a substrate. The electrowetting display pixel structure includes a pixel electrode, an insulating layer and a hydrophobic layer. The pixel electrode is covered with the insulating layer, and the insulating layer is covered with the hydrophobic layer. The hydrophobic layer has at least one flow guiding area, and a flowing path of a fluid medium is determined by a layout of the flow guiding area.

16 Claims, 7 Drawing Sheets

ELECTROWETTING DISPLAY AND PIXEL ARRAY SUBSTRATE THEREOF AND ELECTROWETTING DISPLAY PIXEL STRUCTURE THEREOF

CROSS-REFERENCE TO RELATED APPLICATION

This application claims the priority benefit of Taiwan application serial no. 98146186, filed on Dec. 31, 2009. The entirety of the above-mentioned patent application is hereby incorporated by reference herein and made a part of specification.

BACKGROUND OF THE INVENTION

1. Field of the Invention

The invention relates to an electrowetting display technology and more particularly to an electrowetting display, a pixel array substrate thereof, and an electrowetting display pixel structure thereof.

2. Description of Related Art

FIG. 1 is a top view showing a conventional electrowetting display. Referring to FIG. 1, an electrowetting display 10 includes a plurality of electrowetting display pixel structures 100. Each of the electrowetting display pixel structures 100 includes a pixel electrode 120, an insulating layer 132, a hydrophobic layer 134, an oily fluid medium 100a, an aqueous fluid medium 100b, and a wall 150. The hydrophobic layer 134 covers the insulating layer 132. The insulating layer 132 is disposed on a surface of the pixel electrode 120. The wall 150 is disposed on the hydrophobic layer 134. Moreover, the oily fluid medium 100a is disposed on a surface of the hydrophobic layer 134, and the aqueous fluid medium 100b covers the oily fluid medium 100a.

In FIG. 1, each of the electrowetting display pixel structures 100 is applied with a voltage. At this time, the oily fluid medium 100a and the hydrophobic layer 134 contact at a location on the bottom left of each of the electrowetting display pixel structures 100, and the aqueous fluid medium 100b contacts with the hydrophobic layer 134. Generally, the oily fluid medium 100a is a colored hydrophobic fluid medium and the aqueous fluid medium 100b is a transparent aqueous fluid medium. Therefore, after passing through the oily fluid medium 100a, a light is absorbed by the oily fluid medium 100a, thereby displaying the color of the oily fluid medium 100a. On the other hand, the light passes through the transparent aqueous fluid medium 100b.

Accordingly, when a voltage is applied to the electrowetting display pixel structure 100, the oily fluid medium 100a is compressed and pressed against the wall 150. The electrowetting display pixel structure 100 consequently represents a mode as shown in FIG. 1. On the contrary, when the electrowetting display pixel structure 100 is not applied with a voltage, the oily fluid medium 100a covers the hydrophobic layer 134 uniformly. Here, the light is absorbed by the colored oily fluid medium 100a. Thus, the grayscale variation in display is controlled by converting between the two modes of the electrowetting display pixel structure 100 applied or not applied with a voltage, so that the electrowetting display 10 is capable of displaying images.

The conversion rate of the two modes with the electrowetting display pixel structure 100 applied or not applied with a voltage determines the switching rate when displaying images, and the display quality of the electrowetting display 10 is thus determined. However, if the conversion rate of the two modes increases continuously, a delay effect then occurs during the compression of the oily fluid medium 100a. With the delay effect, as depicted in FIG. 1, a small portion of oily fluid medium 100a remains outside of the location on the bottom left of the electrowetting display pixel structure 100. Furthermore, this delay effect reduces the display quality.

SUMMARY OF THE INVENTION

The invention is directed to a pixel array substrate and an electrowetting display pixel structure thereof. A flow guiding area disposed therein not only increases a compression rate of a fluid medium, but also reduces a delay effect of the fluid medium.

The invention is directed to an electrowetting display having the pixel array substrate and the electrowetting display pixel structure, such that the display quality thereof is greatly enhanced.

The invention is directed to an electrowetting display pixel structure disposed on a substrate. The electrowetting display pixel structure includes a pixel electrode, an insulating layer, and a hydrophobic layer. The insulating layer covers the pixel electrode. The hydrophobic layer covers the insulating layer and has at least one flow guiding area. Here, a flowing path of a fluid medium is determined by a layout of the flow guiding area.

The invention is further directed to a pixel array substrate including a substrate and a plurality of electrowetting display pixel structures. The electrowetting display pixel structures are arranged on the substrate in an array. Each of the electrowetting display pixel structures includes a pixel electrode, an insulating layer, and a hydrophobic layer. The insulating layer covers the pixel electrode. The hydrophobic layer covers the insulating layer and has at least one flow guiding area. Here, a flowing path of a fluid medium is determined by a layout of the flow guiding area.

The invention is further directed to an electrowetting display including a fluid medium, an opposite substrate, and a pixel array substrate. The fluid medium flows between the pixel array substrate and the opposite substrate. The opposite substrate includes a first substrate and a common electrode. The pixel array substrate includes a second substrate and a plurality of electrowetting display pixel structures, where the electrowetting display pixel structures are arranged on the second substrate in an array. Each of the electrowetting display pixel structures includes a pixel electrode, an insulating layer, and a hydrophobic layer. The insulating layer covers the pixel electrode. The hydrophobic layer covers the insulating layer and has at least one flow guiding area. Here, a flowing path of a fluid medium is determined by a layout of the flow guiding area.

In light of the foregoing, the flow guiding areas are disposed in the pixel array substrate of the invention and the electrowetting display pixel structure thereof. By adopting the pixel array substrate and the electrowetting display pixel structure thereof in the electrowetting display, the compression rate of the fluid medium increases effectively and the delay effect of the fluid medium is reduced greatly. Overall, the electrowetting display of the invention has favorable display quality.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

It should be noted that in the following embodiments, an electrowetting display is an active electrowetting display or a passive electrowetting display. In addition, the electrowetting display of the present embodiment is a transmissive electrowetting display, a reflective electrowetting display, or a transflective electrowetting display. Regarding the transmissive or transflective electrowetting display, a backlight module can be further disposed therein to provide a backlight source. As for the reflective electrowetting display, an environmental light is used as the light source.

Figure 1:
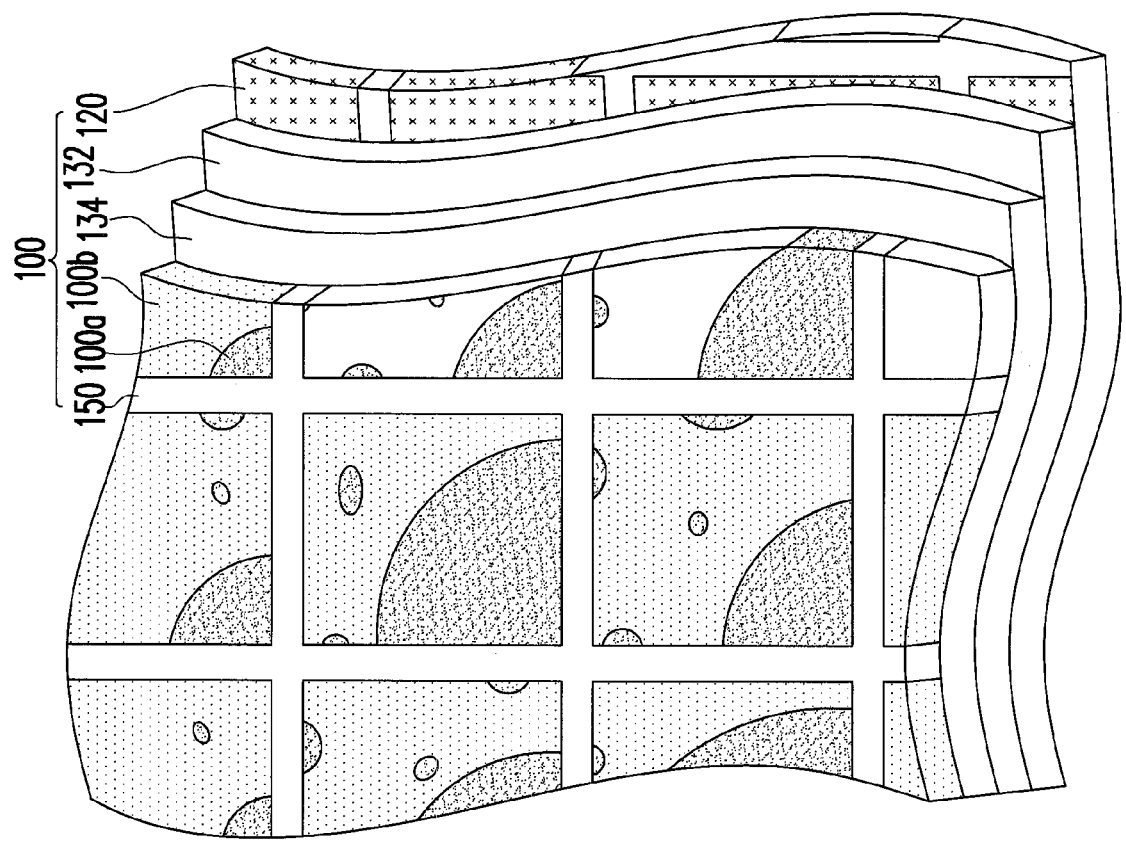
FIG. 1 is a top view showing a conventional electrowetting display.
Figure 2:
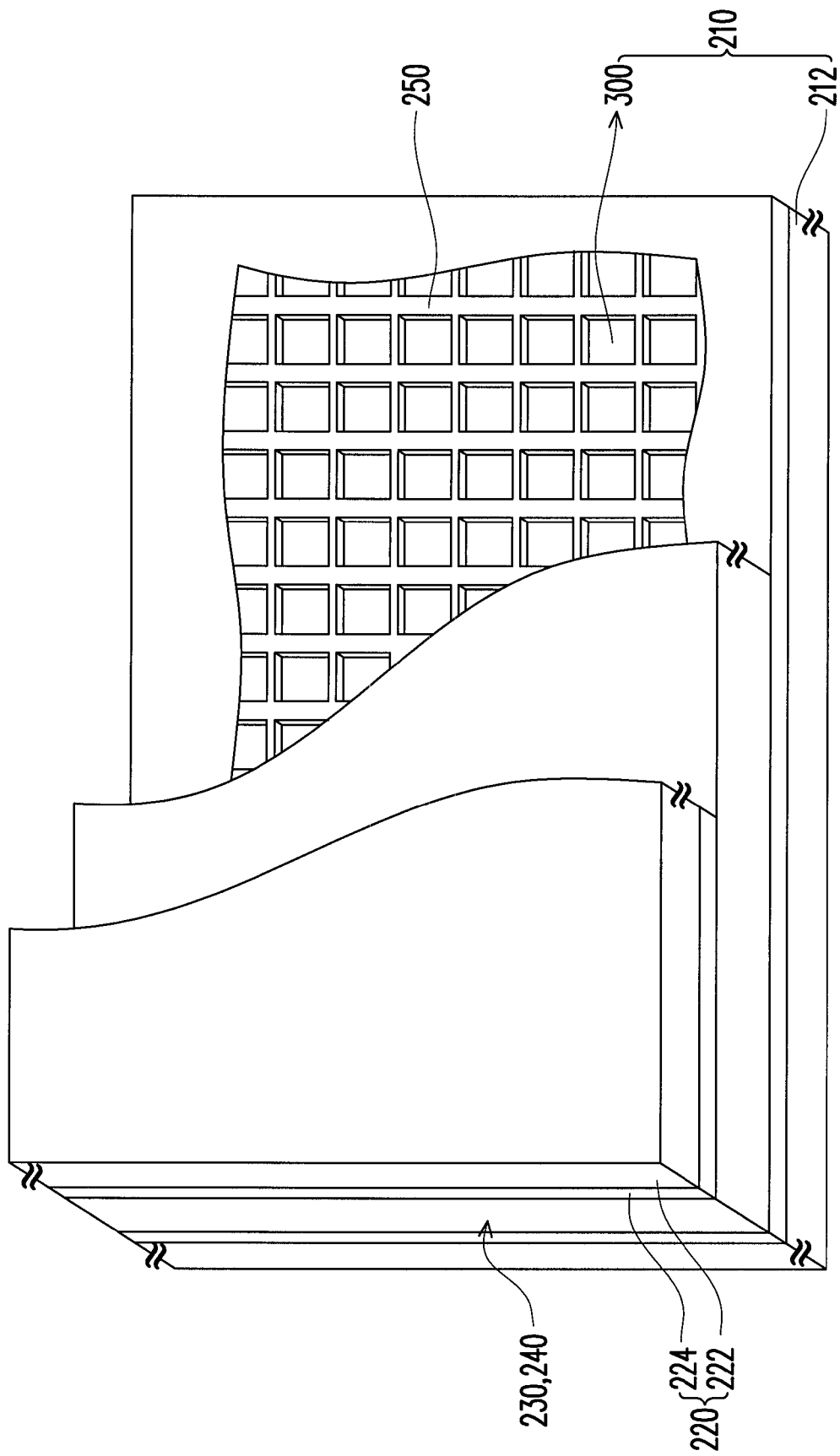
FIG. 2 is a partial cross-sectional top view schematically illustrating an electrowetting display according to an embodiment of the invention.

FIG. 2 is a partial cross-sectional top view schematically illustrating an electrowetting display according to an embodiment of the invention. Refer to FIG. 2, an electrowetting display 200 of the present embodiment includes a pixel array substrate 210, an opposite substrate 220, a fluid medium 230, and a fluid medium 240. In the present embodiment, the two fluid media 230, 240 flow between the pixel array substrate 210 and the opposite substrate 220. Moreover, the two fluid media 230, 240 are insoluble in each other. In practice, a colored oily fluid medium and a transparent aqueous fluid medium are respectively adopted as the fluid medium 230 and the fluid medium 240. However, the invention is not limited thereto.

In the present embodiment, the opposite substrate 220 includes a substrate 222 and a common electrode 224. The common electrode 224 is located between the fluid medium 230 and the substrate 222. On the other hand, the pixel array substrate 210 includes a substrate 212 and a plurality of electrowetting display pixel structures 300. The electrowetting display pixel structures 300 are arranged on the substrate 212 in an array. In practical use, in order to distinguish two adjacent pixel structures 300, a wall 250 is further disposed in the electrowetting display 200.

In the present embodiment, the compression of the fluid medium 230 is determined through a voltage difference between the pixel electrode (to be illustrated later) in the pixel array substrate 210 and the common electrode 224 in the opposite substrate 220.

Figure 2B:
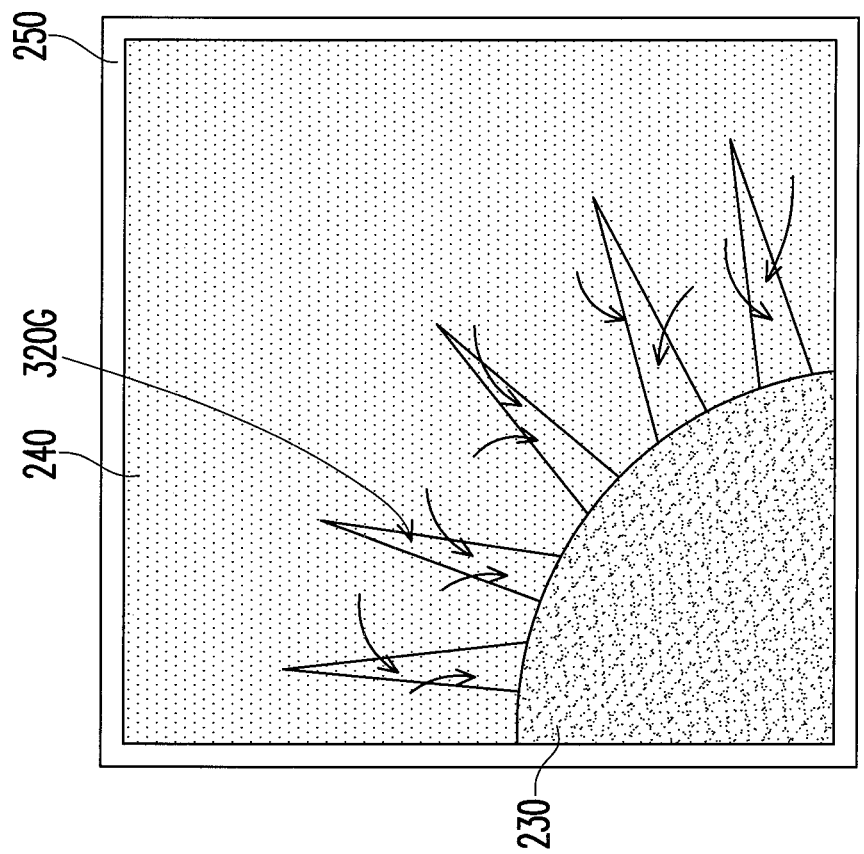
FIG. 2A and FIG. 2B are respectively partial cross-sectional views schematically illustrating two modes of an electrowetting display pixel structure, where the electrowetting display pixel structure is not applied with a voltage or is applied with a voltage according to an embodiment of the invention.
Figure 2A:
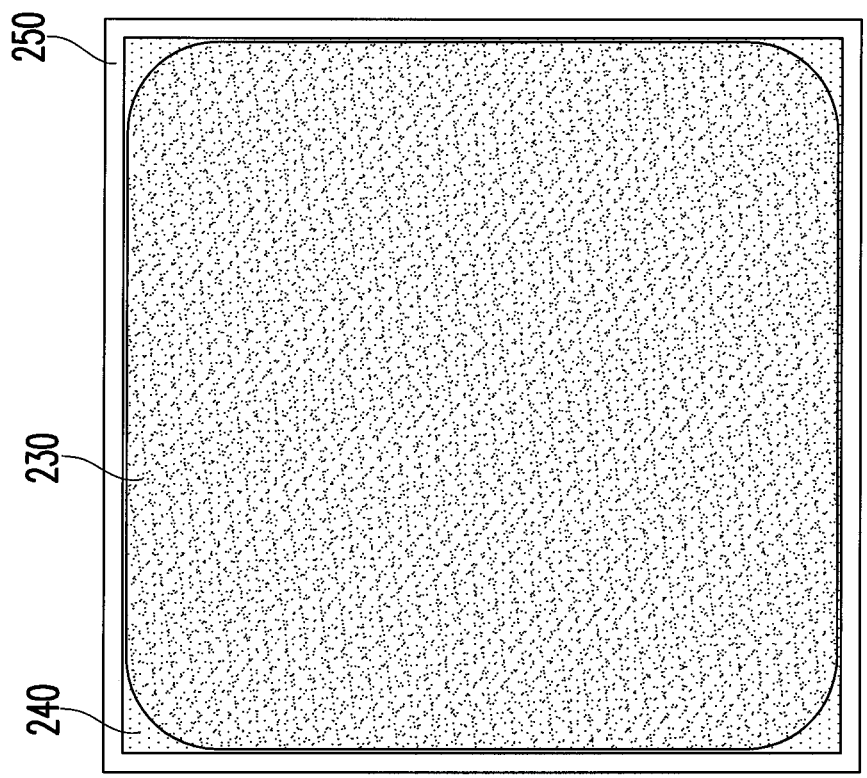

Specifically, as shown in FIG. 2A, the fluid medium 230 covers the substrate 212 uniformly when no voltage is applied. Thus, the backlight or environmental light is absorbed by the colored (i.e. black) fluid medium 230, such that the electrowetting display 200 displays the color (i.e. black). Alternatively, as depicted in FIG. 2B, when a voltage is applied, a polarization phenomenon occurs at an interface between the oily fluid medium 230 and the aqueous fluid medium 240. Consequently, the oily fluid medium 230 is pressed against the wall 250, and the distribution of the oily fluid medium 230 is reduced. At this time, the backlight passes through the transparent fluid medium 240 or the environmental light is reflected by the substrate 212, so that the electrowetting display 200 is capable of displaying images.

Accordingly, in the present embodiment, the images are displayed by converting between the two modes shown in FIG. 2A and FIG. 2B. Nevertheless, the conversion rate between the two modes of FIG. 2A and FIG. 2B affects the switching rate among different display images. In order to increase the conversion rate between these two modes, each electrowetting display pixel structure 300 of the present embodiment has at least one flow guiding area 320G. As illustrated in FIG. 2B, with the disposition of the flow guiding area 320G, flowing directions of the fluid medium 230 are directions directed by arrows. The responding time wasted during the conversion between the two modes of FIG. 2A and FIG. 2B is consequently shortened. The display quality of the electrowetting display 200 is therefore enhanced.

First Embodiment

Figure 3:
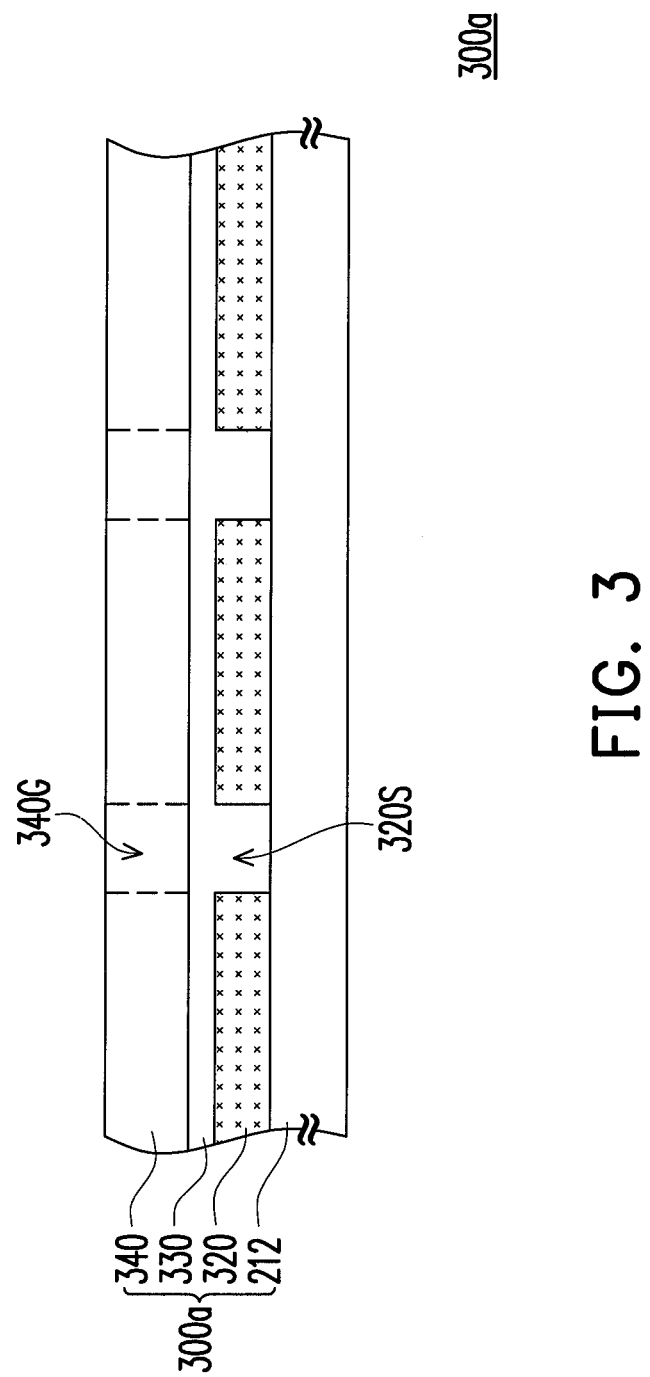
FIG. 3 is a partial cross-sectional schematic diagram illustrating an electrowetting display pixel structure according to a first embodiment of the invention.

According to the flow guiding area 320G shown in FIG. 2B, an electrowetting display pixel structure 300a as depicted in FIG. 3 is further illustrated in the present embodiment. The electrowetting display pixel structure 300a of the present embodiment includes a pixel electrode 320, an insulating layer 330, and a hydrophobic layer 340. Here, the flow media 230, 240 flow on the hydrophobic layer 340. The hydrophobic layer 340 is a planarized hydrophobic layer covering the insulating layer 330 entirely, for example. In the present embodiment, hydrophobic (that is, oleophilic) materials such as a fluorinated compound, for example, Teflon (Trademark name), is adopted as a hydrophobic layer 340. Additionally, the insulating layer 330 covers the pixel electrode 320. The insulating layer 330 is configured to isolate the pixel electrode 320 and the fluid media 230, 240.

More specifically, the pixel electrode 320 of the present embodiment has at least one slit 320S. A lateral force is provided on surfaces at respective sides of the two pixel electrodes 320 beside any one slit 320S, so that the fluid medium 230 is compressed according to a path on the hydrophobic layer 340 corresponding of the slit 320S. To simplify illustration, in the present embodiment, a front projection of the slit 320S on the hydrophobic layer 340 is provided, wherein the projection location projected to the hydrophobic layer 340 is defined as a flow guiding area 340G. Thus, the compression aforementioned is the compression of the fluid medium 230 along the flow guiding area 340G.

Take the flow guiding area 320G in FIG. 2B as an example, practically, this structure is defined by a plurality of needle-shaped slits arranged radially. Here, arrows in FIG. 2B represent the paths and directions traveled by the fluid medium 230 along the flow guiding area 320G when the fluid medium 230 is compressed from the mode of FIG. 2A to the mode of FIG. 2B. In details, in the process of converting from the mode of FIG. 2A to the mode of FIG. 2B, since the fluid medium 230 flows along the flow guiding area 320G, the fluid medium 230 flows along an arrangement of needle-shaped slits $320S_a$ to be compressed against the wall 250 thereunder. On the contrary, when the mode of FIG. 2B is converted to the mode of FIG. 2A, the fluid medium 230 flows along the arrangement of the flow guiding area 320G in a radial manner so as to cover the flow guiding area 320G entirely.

Figure 4:
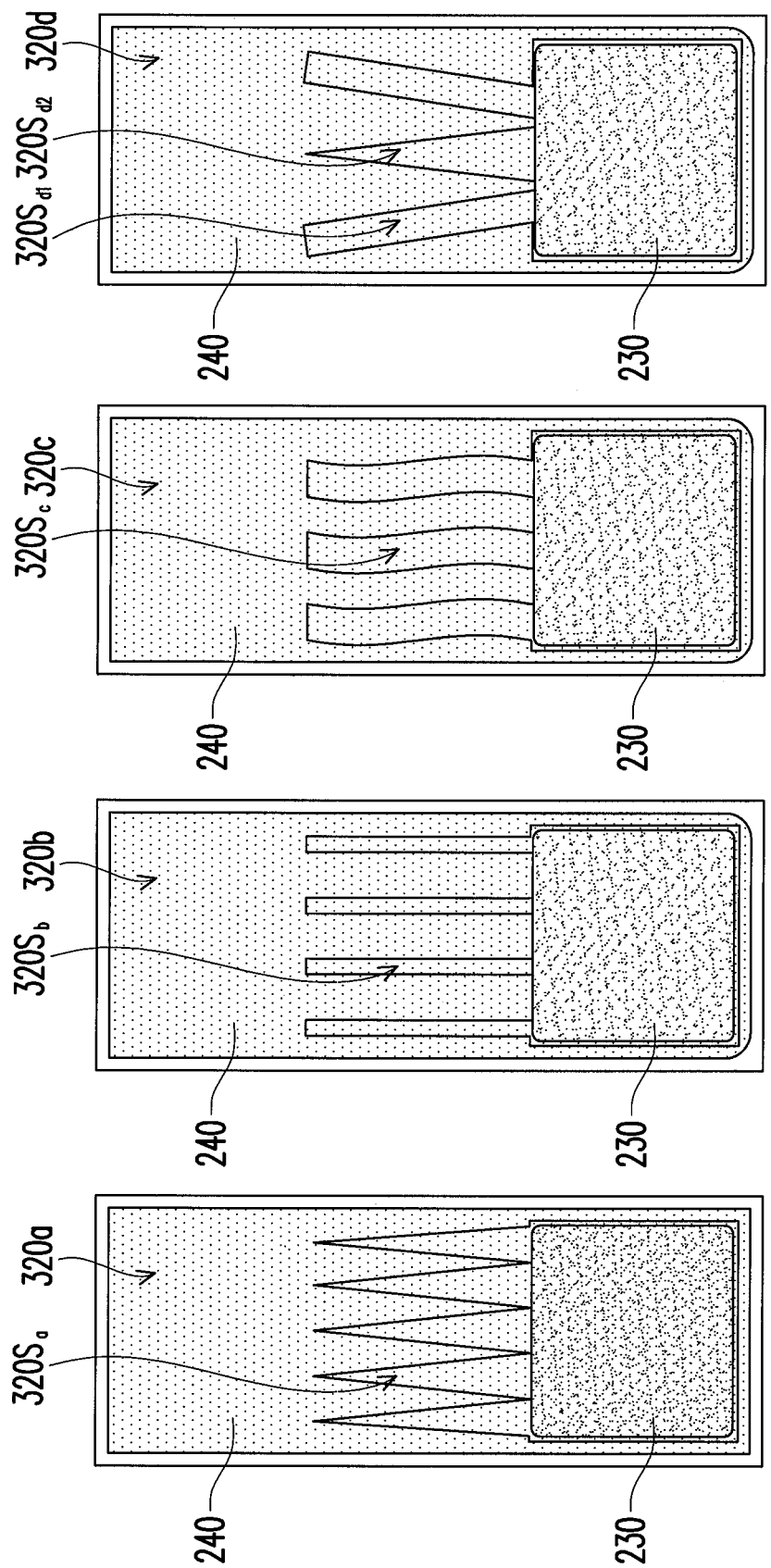
FIGS. 4A through 4D are partial top views schematically illustrating four electrowetting display pixel structures according to an embodiment of the invention.

In summary, several types of pixel electrodes are further provided in the following to illustrate the present embodiment in detail. However, the invention is not limited to these structures. In FIG. 4, take a plurality of pixel electrodes 320a having a plurality of needle-shaped slits 320S$_a$ as an example, the needle-shaped slits 320S$_a$ are arranged horizontally in an extending direction. Alternatively, the pixel electrode 320b and the pixel electrode 320c illustrated in FIG. 4B and FIG. 4C respectively include a plurality of strip-shaped slits 320S$_b$ and a plurality of wave-shaped slits 320S$_c$ arranged horizontally in an extending manner. In addition, a pixel electrode 320d illustrated in FIG. 4D includes strip-shaped slits 320S$_{d1}$ and needle-shaped slits 320S$_{d2}$ arranged radially.

Second Embodiment

Figure 5:
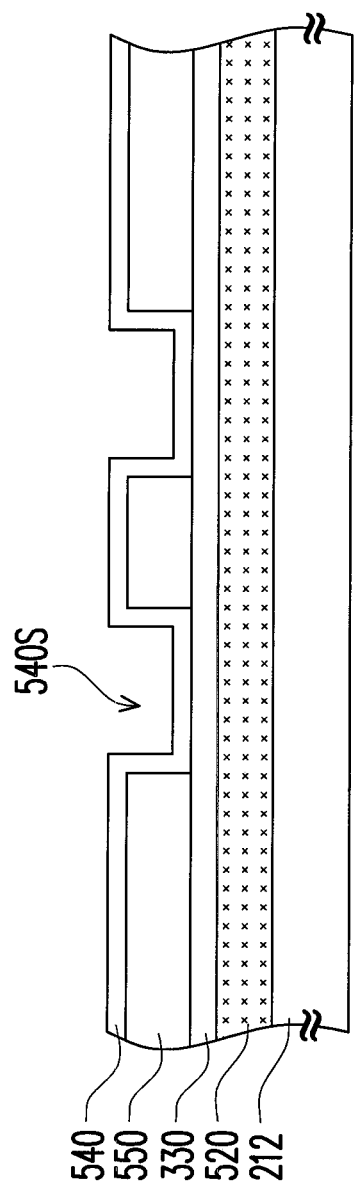
FIG. 5 and FIG. 6 are partial cross-sectional schematic diagrams illustrating two electrowetting display pixel structures according to a second embodiment of the invention.

According to the flow guiding area 320G shown in FIG. 2B, another electrowetting display pixel structure 500 as depicted in FIG. 5 is further illustrated in the present embodiment. The electrowetting display pixel structure 500 of FIG. 5 is similar to the electrowetting display pixel structure 300a of FIG. 3. The main difference between the two is that a pixel electrode 520 does not include a slit, and a plurality of flow guiding structures 550 is further disposed in the electrowetting display pixel structure 500. However, reference numbers in the present embodiment which are the same as or similar to those in the first embodiment represent the same or similar elements. Accordingly, no further description thereof is provided hereinafter.

In the present embodiment, the flow guiding structures 550 are disposed between the insulating layer 330 and a hydrophobic layer 540. The hydrophobic layer 540 covers the flow guiding structures 550 compliantly. As shown in FIG. 5, the hydrophobic layer 540 has a recess 540S between two adjacent flow guiding structures 550. In the present embodiment, a lateral force is provided on surfaces at respective sides of any one recess 540S, so that the fluid medium 230 is compressed along the recesses 540S. Accordingly, the recesses 540S of the present embodiment and the flow guiding area 340G of the first embodiment generally have the same function. That is, the location of the flow guiding area in the present embodiment is the location of the recesses 540S, and a front projection thereof on the substrate 212 is located between front projections of two adjacent flow guiding structures 550 on the substrate 212.

Figure 6:
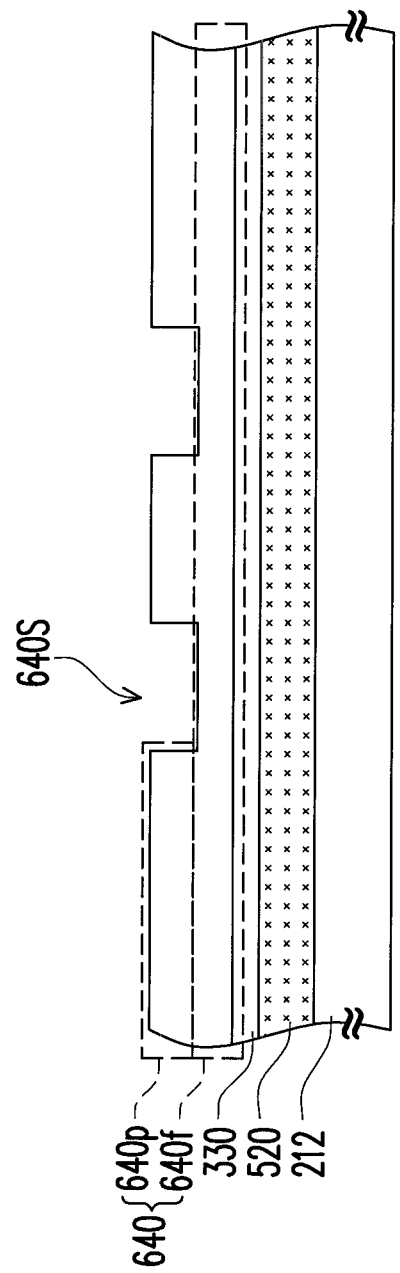

In other embodiments, another electrowetting display pixel structure 600 having a hydrophobic layer 640 similar to the hydrophobic layer 540 is provided and shown in FIG. 6. However, a main difference between the electrowetting display pixel structure 600 in FIG. 6 and the electrowetting display pixel structure 500 in FIG. 5 is that the electrowetting display pixel structure 600 does not include the flow guiding structures 550, and the hydrophobic layer 540 is a patterned hydrophobic layer having the recess patterns.

In details, in the electrowetting display pixel structure 600, the hydrophobic layer 640 includes a planar portion 640f and a plurality of protrusions 640p. The protrusions 640p are disposed on the planar portion 640f.

As shown in FIG. 6, a recess 640S is included between two adjacent protrusions 640p. Similarly, a lateral force is provided on surfaces at respective sides of the recesses 640S, so that the fluid medium 230 is compressed along the recesses 640S. That is, the recesses 640S of the present embodiment, the aforementioned recesses 540S, and the flow guiding area 340G of the first embodiment generally have the same function. In other words, the location of the flow guiding area in FIG. 6 is the location of the recesses 640S, and front projections thereof on the substrate 212 are located between front projections of two adjacent protrusions 640p on the substrate 212.

Finally, the flow guiding structures 550 or the protrusions 640p constituting the flow guiding area of the present embodiment are in a strip shape, a needle shape, or a wave shape. The invention, however, is not limited thereto.

In the traditional electrowetting display technique, the increase in responding rate of the fluid medium causes the delay phenomenon in fluid medium. Nevertheless, in the embodiments aforementioned, the layout of the flow guiding area (i.e. 320G, 340G, etc) is utilized to determine a flowing path of the fluid medium 230. As a consequence, the fluid medium 230 has an expected flowing path and the compression rate of the fluid medium 230 is therefore increased. Furthermore, other than increasing the flowing rate, the flow guiding area further improves the delay phenomenon of the fluid medium 230.

In summary, the electrowetting display of the invention and the electrowetting display pixel structure of the pixel array substrate thereof have the flow guiding areas. Through the disposition of the flow guiding areas, the delay phenomenon of the fluid medium is greatly reduced, the compression rate of the fluid medium is increased effectively, and the display quality of the electrowetting display is enhanced.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An electrowetting display pixel structure disposed on a substrate, the electrowetting display pixel structure comprising:
   a pixel electrode;
   an insulating layer covering the pixel electrode;
   a hydrophobic layer covering the insulating layer and having at least one flow guiding area, wherein a flowing path of a fluid medium is determined by a layout of the flow guiding area; and
   a plurality of flow guiding structures disposed between the insulating layer and the hydrophobic layer, wherein a front projection of the flow guiding area on the substrate is located between a plurality of front projections of the flow guiding structures on the substrate.

2. The electrowetting display pixel structure as claimed in claim 1, wherein the flow guiding structures have a strip shape, a needle shape, or a wave shape.

3. The electrowetting display pixel structure as claimed in claim 1, wherein the pixel electrode comprises at least one slit, and the flow guiding area and the slit overlap the front projections on the substrate.

4. The electrowetting display pixel structure as claimed in claim 3, wherein the slit has a strip shape, a needle shape, or a wave shape.

5. A pixel array substrate, comprising:
   a substrate; and
   a plurality of electrowetting display pixel structures arranged on the substrate in an array, wherein each of the electrowetting display pixel structures comprises:
   a pixel electrode;
   an insulating layer covering the pixel electrode;

a hydrophobic layer covering the insulating layer and having at least one flow guiding area, wherein a flowing path of a fluid medium is determined by a layout of the flow guiding area; and a plurality of flow guiding structures disposed between the insulating layer and the hydrophobic layer, wherein a front projection of the flow guiding area on the substrate is located between a plurality of front projections of the flow guiding structures on the substrate.

6. The pixel array substrate as claimed in claim 5, wherein the pixel electrode comprises at least one slit, and the flow guiding area and the slit overlap the front projections on the substrate.

7. An electrowetting display, comprising:
a fluid medium;
a substrate comprising
a first substrate and
a common electrode located between the fluid medium and the first substrate; and
a pixel array substrate positioned opposite to the substrate, the fluid medium flowing between the pixel array substrate and the substrate, wherein the pixel array substrate comprises:
a second substrate; and
a plurality of electrowetting display pixel structures arranged on the second substrate in an array, wherein each of the electrowetting display pixel structures comprises:
a pixel electrode;
an insulating layer covering the pixel electrode;
a hydrophobic layer covering the insulating layer and having at least one flow guiding area, wherein a flowing path of a fluid medium is determined by a layout of the flow guiding area; and
a plurality of flow guiding structures disposed between the insulating layer and the hydrophobic layer, wherein a front projection of the flow guiding area on the second substrate is located between a plurality of front projections of the flow guiding structures on the second substrate.

8. The electrowetting display as claimed in claim 7, wherein the pixel electrode comprises at least one slit, and the flow guiding area and the slit overlap the front projections on the second substrate.

9. An electrowetting display pixel structure disposed on a substrate, the electrowetting display pixel structure comprising:
a pixel electrode;
an insulating layer covering the pixel electrode; and
a hydrophobic layer covering the insulating layer and comprising a planar portion, a plurality of protrusions and at least one flow guiding area, the protrusions disposed on the planar portion, wherein a front projection of the flow guiding area on the substrate is located between a plurality of front projections of the protrusions on the substrate, a flowing path of a fluid medium is determined by a layout of the flow guiding area.

10. The electrowetting display pixel structure as claimed in claim 9, wherein the protrusions have a strip shape, a needle shape, or a wave shape.

11. The electrowetting display pixel structure as claimed in claim 9, wherein the pixel electrode comprises at least one slit, and the flow guiding area and the slit overlap the front projections on the substrate.

12. The electrowetting display pixel structure as claimed in claim 11, wherein the slit has a strip shape, a needle shape, or a wave shape.

13. A pixel array substrate, comprising:
a substrate; and
a plurality of electrowetting display pixel structures arranged on the substrate in an array, wherein each of the electrowetting display pixel structures comprises:
a pixel electrode;
an insulating layer covering the pixel electrode; and
a hydrophobic layer covering the insulating layer and comprising a planar portion, a plurality of protrusions and at least one flow guiding area, the protrusions disposed on the planar portion, wherein a front projection of the flow guiding area on the substrate is located between a plurality of front projections of the protrusions on the substrate, a flowing path of a fluid medium is determined by a layout of the flow guiding area.

14. The pixel array substrate as claimed in claim 13, wherein the pixel electrode comprises at least one slit, and the flow guiding area and the slit overlap the front projections on the substrate.

15. An electrowetting display, comprising:
a fluid medium;
a substrate comprising
a first substrate and
a common electrode located between the fluid medium and the first substrate; and
a pixel array substrate positioned opposite to the substrate, the fluid medium flowing between the pixel array substrate and the substrate, wherein the pixel array substrate comprises:
a second substrate; and
a plurality of electrowetting display pixel structures arranged on the second substrate in an array, wherein each of the electrowetting display pixel structures comprises:
a pixel electrode;
an insulating layer covering the pixel electrode; and
a hydrophobic layer covering the insulating layer and comprising a planar portion, a plurality of protrusions and at least one flow guiding area, the protrusions disposed on the planar portion, wherein a front projection of the flow guiding area on the second substrate is located between a plurality of front projections of the protrusions on the second substrate, a flowing path of a fluid medium is determined by a layout of the flow guiding area.

16. The electrowetting display as claimed in claim 15, wherein the pixel electrode comprises at least one slit, and the flow guiding area and the slit overlap the front projections on the second substrate.

* * * * *